(12) United States Patent
Lee et al.

(10) Patent No.: US 8,392,647 B2
(45) Date of Patent: Mar. 5, 2013

(54) SOLID STATE STORAGE SYSTEM FOR CONTROLLING RESERVED AREA FLEXIBLY AND METHOD FOR CONTROLLING THE SAME

(75) Inventors: Myung Suk Lee, Gyeonggi-do (KR); Wun Mo Yang, Gyeonggi-do (KR); Jeong Soon Kwak, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 425 days.

(21) Appl. No.: 12/647,185

(22) Filed: Dec. 24, 2009

(65) Prior Publication Data
US 2011/0078364 A1    Mar. 31, 2011

(30) Foreign Application Priority Data

Sep. 30, 2009    (KR) .......................... 10-2009-0093594

(51) Int. Cl.
*G06F 12/00* (2006.01)
(52) U.S. Cl. ................ 711/103; 711/202; 711/E12.002; 714/724
(58) Field of Classification Search .................. 711/103, 711/E12.001, E12.002, 202; 365/185.09, 365/185.11, 200, 230.03; 714/746, 763, 714/E11.023
See application file for complete search history.

(56) References Cited

U.S. PATENT DOCUMENTS

| | | | |
|---|---|---|---|
| 6,973,531 B1 | 12/2005 | Chang et al. | |
| 7,013,376 B2 * | 3/2006 | Hooper, III | 711/202 |
| 7,434,122 B2 | 10/2008 | Jo | |
| 7,675,776 B2 * | 3/2010 | Allen et al. | 365/185.09 |
| 7,873,885 B1 * | 1/2011 | Shin et al. | 714/724 |
| 8,050,093 B2 * | 11/2011 | Hahn et al. | 365/185.09 |
| 2002/0120824 A1 * | 8/2002 | Hooper, III | 711/202 |
| 2009/0040827 A1 | 2/2009 | Kim | |
| 2010/0082883 A1 * | 4/2010 | Chen et al. | 711/103 |
| 2010/0180069 A1 * | 7/2010 | Yeh | 711/103 |

FOREIGN PATENT DOCUMENTS

JP    2000-011677 A    1/2000

* cited by examiner

*Primary Examiner* — Pierre-Michel Bataille
(74) *Attorney, Agent, or Firm* — Ladas & Parry LLP

(57) ABSTRACT

A solid state storage system includes a flash memory area and a memory controller. The flash memory area includes memory blocks and replacement blocks configured to replace bad blocks occurring within the memory blocks. The memory controller is configured to perform a logical-to-physical address mapping on logical blocks including the replacement blocks, and select the replacement blocks using logical addresses of the logical blocks corresponding to the bad blocks.

15 Claims, 3 Drawing Sheets

SOLID STATE STORAGE SYSTEM FOR CONTROLLING RESERVED AREA FLEXIBLY AND METHOD FOR CONTROLLING THE SAME

CROSS-REFERENCES TO RELATED APPLICATION

The present application claims priority under 35 U.S.C. §119(a) to Korean application number 10-2009-0093594, filed on Sep. 30, 2009, in the Korean Intellectual Property Office, which is incorporated herein by reference in its entirety as set forth in full.

BACKGROUND

1. Technical Field

The present invention relates generally to a solid state storage system and a method for controlling the same, and more particularly to a solid state storage system for controlling a reserved area flexibly, and a method for controlling the same.

2. Related Art

Nonvolatile memories are widely used as storage memories for portable information devices. A recent trend is utilizing solid state drives (SSDs) using NAND flash memories in personal computers (PC), instead of conventional hard disk drives (HDD). Further, SSDs using NAND flash memories are commercially available, and are expected to make inroads into HDD markets.

However SSDs can be problematic as bad blocks may occur during the use of such SDDs. Bad blocks may be caused by process failure of flash memories, or may by degradation in characteristics of flash memory cells due to frequent operations. Such bad blocks are replaced with blocks of a reserved area in order not to refer to physical areas of the bad blocks. To accommodate the necessity for replacing bad blocks, a reserved area space is allocated. That is, additional physical areas are allocated and used only for the purpose of replacing the bad blocks.

For the efficient management of blocks, an address mapping is performed. The address mapping is to connect a logical address of a block provided from the external to an address of a physical area of a block practically stored. Since the reserved area is an area allocated only for the purpose of replacing a bad block, it is not associated with a normal data area. Hence, the reserved area is excluded from the address mapping. However, it is necessary to allocate an additional bad block management map for managing information on position of the bad block. The additional allocation of the bad block management map degrades the entire memory efficiency. Moreover, when the number of occurrence of bad blocks is small, the use efficiency of the already allocated extra reserved area is degraded.

SUMMARY

A solid state storage system for managing a bad block is described herein.

A method for controlling a solid state storage system for managing a bad block is described herein.

In one embodiment of the present invention, a solid state storage system includes: a flash memory area comprising a plurality of memory blocks and a plurality of replacement blocks configured to replace bad blocks which occur within the memory blocks; and a memory controller configured to perform a logical-to-physical address mapping on logical blocks comprising the replacement blocks, and select the replacement blocks using logical addresses of the logical blocks corresponding to the bad blocks.

In another embodiment of the present invention, a solid state storage system includes: a flash memory area comprising a plurality of memory blocks and a plurality of replacement blocks configured to replace bad blocks which occur within the memory blocks; and a memory controller configured to allocate logical addresses and physical addresses to the replacement blocks, select any one of the replacement blocks corresponding to the bad block when the bad block occurs, and perform a wear leveling on extra replacement blocks which are not used to replace the bad blocks.

In another embodiment of the present invention, a method for controlling a solid state storage system includes the steps of: creating an address mapping table regarding entire logical blocks, including replacement blocks; calculating logical addresses of the replacement blocks, when bad blocks occur, by using a maximum logical address of the logical blocks and a pointer; replacing physical addresses of the bad blocks with physical addresses mapped into the calculated replacement blocks; and performing a wear leveling on extra replacement blocks.

BRIEF DESCRIPTION OF THE DRAWINGS

Features, aspects, and embodiments are described in conjunction with the attached drawings, in which.

DETAILED DESCRIPTION

Hereinafter, a solid state storage system and a method for controlling the same, according to an embodiment of the present invention, will be described below with reference to the accompanying drawings through preferred embodiments.

A solid state storage system according to one embodiment will be described below with reference to FIG. 1.

Figure 1:
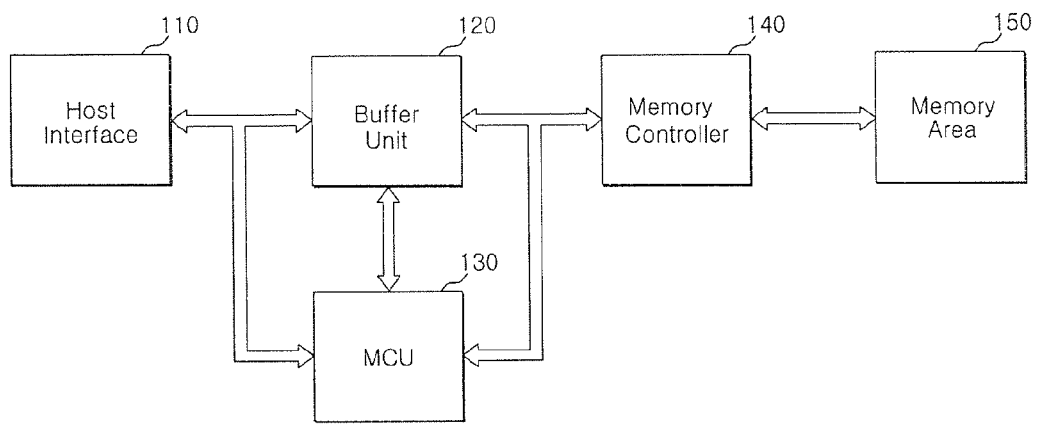
FIG. 1 is a block diagram of a solid state storage system according to one embodiment.

FIG. 1 is a block diagram of a solid state storage system 100 according to one embodiment. A storage system using a NAND flash memory is taken as an example of the solid state storage system 100 set forth herein.

Referring to FIG. 1, the solid state storage system 100 includes a host interface 110, a buffer unit 120, a micro control unit (MCU) 130, a memory controller 140, and a memory area 150.

The host interface 110 is connected to the buffer unit 120. The host interface 110 transmits and receives control commands, address signals, and data signals between an external host (not shown) and the buffer unit 120. An interface scheme between the host interface 110 and the external host (not shown) may be any one of Serial Advanced Technology Attachment (SATA), Parallel Advanced Technology Attachment (PATA), SCSI, Express Card, PCI-Express, or the like. However it should be understood that the present invention is not limited thereto, as the present invention may utilize any appropriate interface scheme.

The buffer unit 120 buffers signals outputted from the host interface 110, or temporarily stores mapping information between a logical address and a physical address, block allocation information of the memory area 150, and external data. The buffer unit 120 may be a buffer using a static random access memory (SRAM), however the present invention is not limited in this regard.

The MCU 130 may transmit and receive control commands, address signals, and data signals to and from the host interface 110, or may control the memory controller 140 using said signals.

The memory controller 140 selects a predetermined NAND flash memory (ND) among a plurality of NAND flash memories of the memory area 150, and provides a write command, an erase command, or a read command. Specifically, the memory controller 140 according to one embodiment may flexibly manage the reserved area prepared for the occurrence of bad blocks.

Conventionally, a reserved area having a predetermined size corresponding to a bad block is allocated to each block. In such a conventional system, each reserved area has a physically fixed address. Accordingly, the address mapping is not applied to the reserved area. Therefore, the blocks within the fixed physical address range are selected and replaced whenever bad blocks occur. As such, since the blocks of the reserved area have fixed physical addresses, the reserved areas which do not replace the bad blocks are not used any more, and exist as extra areas. Furthermore, a bad block management map must be additionally allocated to the blocks which are allocated as the reserved areas, in order to store information on positions of the bad blocks.

The memory controller 140 according to one embodiment performs the address mapping as a whole, including the replacement blocks, i.e., the reserved areas prepared for the bad blocks. That is, the reserved area according to one embodiment has a logical address as well as a physical address. Furthermore, the memory controller 140 may select blocks of the allocated reserved area using an address size of the logical block or a maximum address value of the logical block. Hence, the bad block management map for the reserved area is not required and may not be additionally added. Moreover, even in the case of the blocks already allocated as the reserved area, if the occurrence frequency of the bad blocks is low, the blocks of the extra reserved area may participate in a wear leveling just like a normal data area, or may be allocated as a data area.

In this way, according to one embodiment, the memory efficiency may be increased, and the use efficiency of the reserved area may also be increased.

The memory area 150 is controlled by the memory controller 140 to perform a data write operation, a data erase operation, and a data read operation. The memory area 150 may be a NAND flash memory. According to one embodiment, the NAND flash memory may be a single level cell (SLC) or a multi level cell (MLC). The memory area 150 may be provided with a plurality of chips each including a plurality of blocks having a plurality of pages.

Figure 2:
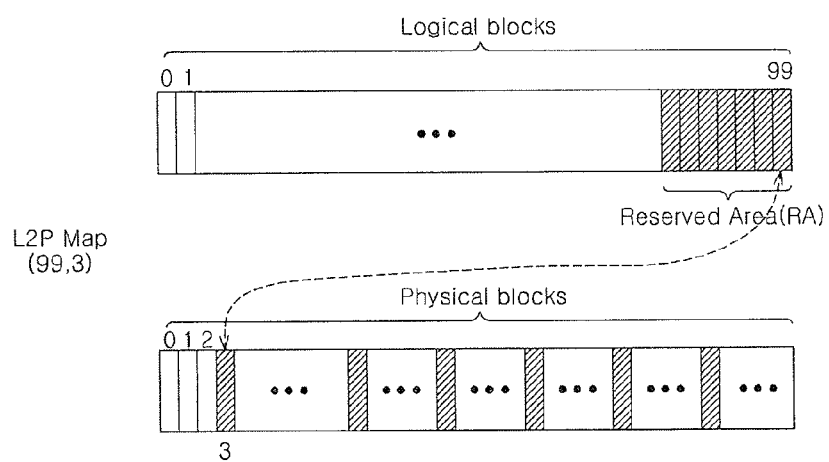
FIG. 2 is a conceptual block diagram shown for illustrating an address mapping of a reserved area in FIG. 1.

FIG. 2 is a conceptual block diagram shown for illustrating an address mapping of a reserved area in FIG. 1.

Referring to FIG. 2, logical blocks allocated with zeroth to ninety-ninth addresses are exemplary illustrated. A predetermined number of logical blocks among the plurality of logical blocks are allocated as a reserved area RA. In this case, the reserved area RA may be allocated within a series of logical address groups in order to easily determine and calculate positions of the blocks included in the corresponding area.

In one embodiment, for example, the reserved area RA allocated in descending order from the maximum address value of the logical blocks, i.e., most significant bit (MSB). Although it should be understood that the present invention is not limited hereto. This is done for providing information on the reserved area RA by using the maximum address value of the logical blocks or the maximum address size of the logical blocks, without additional mapping information. In other words, an additional management map representing the reserved area RA is not allocated. This will be described below in detail with reference to FIG. 3.

According to one embodiment, since the reserved area RA is also an area subject to the address mapping, it may be made to have a logical address and a physical address by the memory controller 140 of FIG. 1.

For example, the logical block having the ninety-ninth address in the reserved area RA may be set to be allocated to the third address of the physical block, which may be stored as (99, 3) in a logical-to-physical address mapping table as shown in FIG. 2. It is apparent that other logical blocks which are not described in the reserved area RA also have physical addresses. It can be seen that the reserved area RA having a predetermined address group in the logical block is located in the physical block in a distributed manner by the address mapping.

Figure 3:
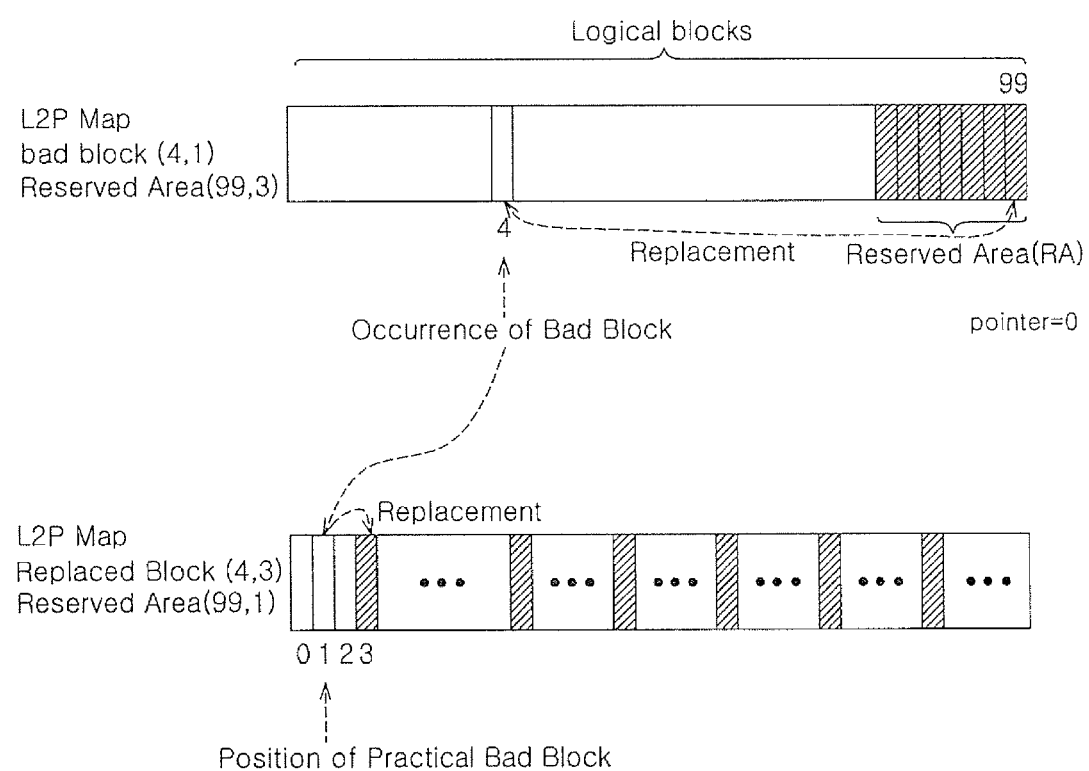
FIG. 3 is a conceptual block diagram shown for illustrating a process of replacing a bad block in FIG. 1.

FIG. 3 is a conceptual block diagram shown for illustrating a process of allocating the reserved area RA with respect to the bad block in FIGS. 1 and 2.

As an illustrative example, a case where the block having the fourth logical address is a bad block is illustrated in FIG. 3.

One block of the reserved area RA must be selected, and the block having the fourth logical address must be replaced with the selected block of the reserved area RA. According to one embodiment, regarding the first bad block, the block having the maximum logical address value is selected. That is, whenever the bad block occurs, the blocks of the reserved area RA having addresses sequentially decreasing from the maximum logical address value are selected. In this case, the criteria which decrease the addresses sequentially may be defined by setting a pointer. While the embodiment above describes sequentially decreasing from the maximum logical address value, it should be understood that this is by way of example only, and the present invention is not limited hereto.

In more detail, the pointer is initialized to zero (0). When the bad block occurs, the logical block of the reserved area RA that replaces the bad block is selected by decreasing the maximum logical address value according to the value of the pointer. Then, the pointer is incremented by one whenever the bad block occurs. Therefore, if the maximum logical address value is decreased by the pointer value whenever the bad block occurs, the blocks having the logical addresses sequentially decreasing from the maximum address value may be designated. Those blocks may be set as the blocks of the reserved area RA which replace the bad blocks. Therefore, the reserved area RA may be allocated and selected using the maximum value of the pointer and the maximum logical address value of the logical block, without additional bad block management map. The maximum value of the pointer may be set considering the occurrence frequency of the bad blocks. Thus, the size of the reserved area RA or the number of blocks of the reserved areas RA may be easily controlled as the size of the reserved area RA or the number of blocks of the reserved areas RA determined by the pointer.

Next, the following description will be made for a case where the block having the fourth logical address is a bad block. As a result of an address mapping on the bad block, the block having the fourth logical address, i.e., (4, 1), is allocated to have the first physical address. In this case, since the bad block occurs, a case where the ninety-ninth logical block having the maximum logical address value has the third physical address as the result of the address mapping is taken as an example.

In order to change the physical address of the bad block, the block (4, 3) is allocated instead of the bad block (4, 1), and the ninety-ninth logical address of the reserved area RA is mapped into the first block (99, 1) in order to designate the practical physical position of the bad block. In this way, since the bad block is replaced with the reserved area RA, the logical address of the bad block is maintained as it is, and only the physical position of the bad block is changed.

Figure 4:
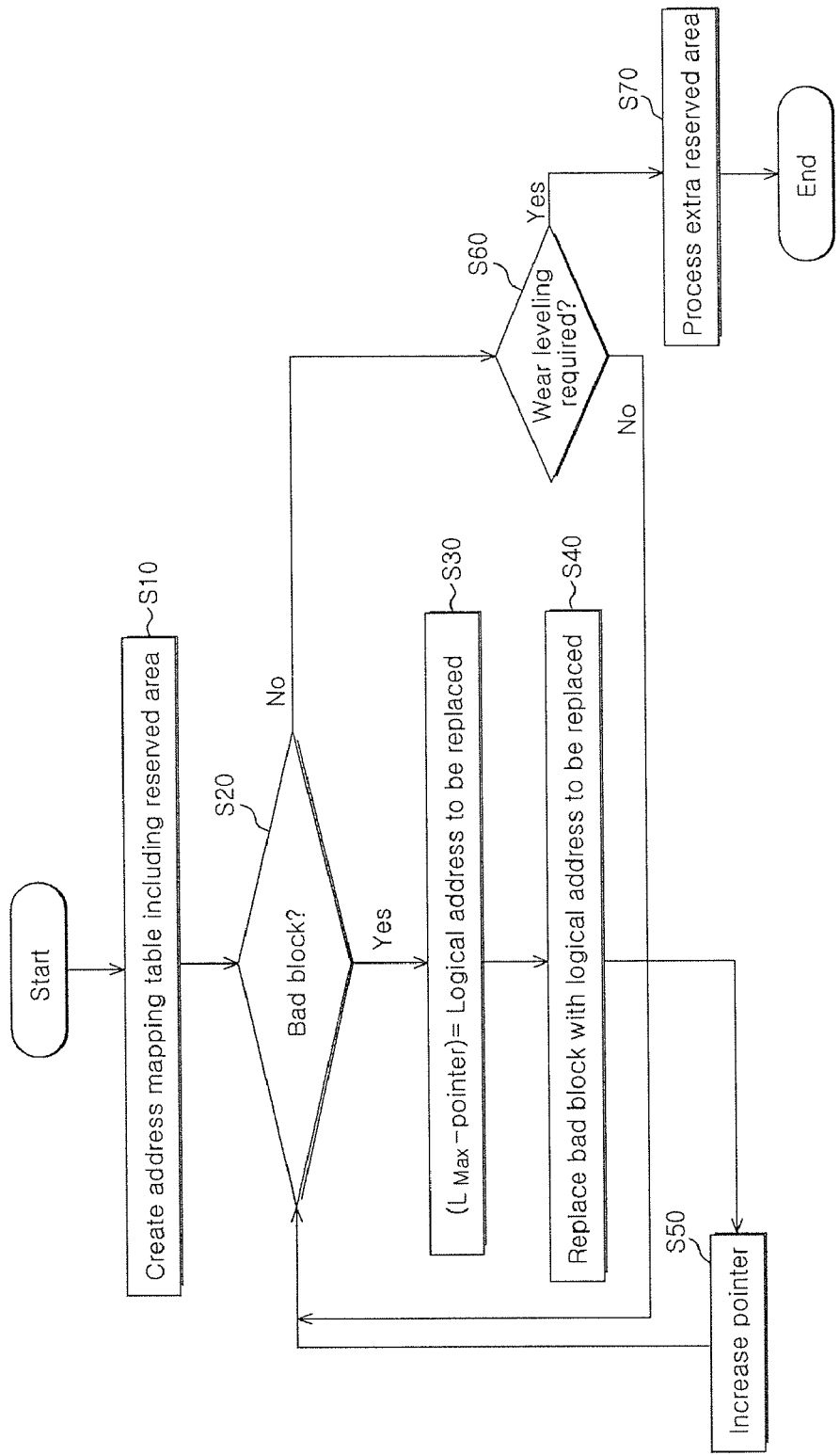
FIG. 4 is a flowchart shown for illustrating a method for controlling the solid state storage system of FIG. 1.

FIG. 4 is a flowchart shown for illustrating a method for controlling the solid state storage system of FIG. 1.

Referring to FIGS. 1 through 4, the memory controller 140 creates the address mapping table including the reserved area RA (S10).

Since the reserved area RA, according to one embodiment, has both the logical address and the physical address, the blocks of the extra reserved area RA which do not participate in the replacement of the bad block may be used as the data blocks. Furthermore, the value of the pointer which will be used later may also be initialized. When the logical address is used as the reference in selecting the blocks of the reserved area RA, the pointer is initialized to 0.

Whether a bad block occurs during the practical write and read operations is determined in step (S20).

When the bad block occurs, selecting one of the blocks of the reserved area RA in order to replace the bad block with the selected block of the reserved area RA is important.

The logical address to be replaced may be calculated by decreasing the maximum logical address value of the logical block according to the value of the pointer (S30).

As described above, when the address value of the logical block is a maximum, the initialized pointer is set to 0. Therefore, when a bad block initially occurs, the logical block having the maximum logical address value may be selected as the replacement block.

The physical area of the bad block may be replaced with the block of the reserved area RA by replacing the practical physical address of the bad block with the physical address mapped into the calculated logical address of the block of the reserved area RA (S40).

Subsequently, the value of the pointer is updated and increased by 1 (S50). Therefore, when the bad block occurs during operations, the bad block may be sequentially replaced with another block of the reserved area RA by repeating the above-described processes S20 to S50.

Whether performing a wear leveling during the operation is necessary is determined at the step (S60). If wear leveling is not required, the above-described processes are continuously repeated as shown in FIG. 4. However, when the bad block do not occur any more and the predetermined operation is performed so that the number of erase cycles reaches a threshold value, it is determined that the wear leveling is required, and extra reserved area RA is processed (S70).

That is, if all the blocks included in the reserved area RA are not used as the replacement blocks for the bad blocks, the blocks included in the extra reserved area RA are used as data areas. Therefore, the blocks included in the extra reserved area RA are also subject to the wear leveling, and may be selected as data blocks. The extra reserved area RA may be calculated using the final stored pointer value. That is, whether the blocks are the blocks included in the extra reserved area RA may be determined by decreasing the maximum logical address value of the logical block by the final stored pointer value. During the wear leveling, data distribution may be derived, including the blocks of the extra reserved area RA. In this way, a larger number of data blocks may be used, thereby increasing the efficiency of the data storage areas.

As such, according to one embodiment, the reserved area RA may be used not fixedly but flexibly as illustrated above. That is, the reserved area RA may be used to replace the bad blocks and also may be used as data blocks when the reserved area RA remains without replacing the bad blocks. Furthermore, the blocks of the reserved area RA may be selected without an additional map. According to embodiments, since the blocks of the reserved area RA are simply selected using the logical address and the pointer, easy of control of the solid state storage system is improved.

While certain embodiments have been described above, it will be understood to those skilled in the art that the embodiments described are by way of example only. Accordingly, the system and method described herein should not be limited based on the described embodiments. Rather, the system and method described herein should only be limited in light of the claims that follow when taken in conjunction with the above description and accompanying drawings.

What is claimed is:

1. A solid state storage system comprising:
    a flash memory area comprising:
    a plurality of memory blocks; and
    a plurality of replacement blocks configured to replace bad blocks occurring within the memory blocks; and
    a memory controller configured to perform a logical-to-physical address mapping on logical blocks comprising the replacement blocks, and select a replacement block among the plurality of replacement blocks using logical addresses of the logical blocks corresponding to the bad blocks,
    wherein, when a bad block occurs, the memory controller selects a replacement block corresponding to the bad block, the replacement block having a logical address corresponding to a resulting value obtained by decreasing a maximum logical address of the logical block according to a value of a pointer.

2. The solid state storage system according to claim 1, wherein the memory controller sets the pointer, which is configured to determine positions and selection order of the replacement blocks.

3. The solid state storage system according to claim 2, wherein a range of the replacement block is defined by an initial value and an upper limit value of the pointer.

4. A solid state storage system, comprising:
    a flash memory area comprising:
    a plurality of memory blocks; and
    a plurality of replacement blocks configured to replace bad blocks occurring within the memory blocks; and
    a memory controller configured to allocate logical addresses and physical addresses to the replacement blocks, select a replacement block corresponding to a bad block when the bad block occurs, and perform a wear leveling on extra replacement blocks not used to replace the bad blocks,
    wherein, when a bad block occurs, the memory controller selects a replacement block corresponding to the bad block, the replacement block having a logical address corresponding to a resulting value obtained by decreasing a maximum logical address of the logical block according to a value of a pointer.

5. The solid state storage system according to claim 4, wherein the memory controller sets the pointer which is configured to determine positions and selection order of the replacement blocks.

6. The solid state storage system according to claim 5, wherein the memory controller increments the value of the pointer when a bad block occurs.

7. The solid state storage system according to claim 4, wherein the memory controller maintains a logical address of the bad block, and replaces a physical address of the bad block with a physical address of the replacement block.

8. The solid state storage system according to claim 5, wherein the memory controller performs the wear leveling on the replacement blocks as normal data blocks by using a final stored pointer.

9. The solid state storage system according to claim 5, wherein a maximum value of the pointer is a total number of blocks included in the replacement blocks.

10. The solid state storage system according to claim 9, wherein a range of the replacement block is defined by an initial value and an upper limit value of the pointer.

11. A method for controlling a solid state storage system, comprising:
    creating an address mapping table regarding all logical blocks, including replacement blocks;
    when bad blocks occur calculating logical addresses of the replacement blocks by using a maximum logical address of the logical blocks and a pointer;
    replacing physical addresses of the bad blocks with physical addresses mapped into the calculated replacement blocks; and
    performing a wear leveling on extra replacement blocks not used to replace the bad blocks,
    wherein calculating the logical addresses of the logical blocks included in reserved areas comprises decreasing the maximum logical address of the logical blocks according to a value of the pointer.

12. The method according to claim 11, wherein creating the address mapping table comprises initializing the pointer configured to determine positions and selection order of reserved areas.

13. The method according to claim 11, wherein replacing the physical addresses of the bad block comprises maintaining logical addresses of the bad blocks, and replacing physical addresses of the bad blocks with physical addresses of the logical blocks of a selected reserved area.

14. The method according to claim 11, further comprising determining whether the logical block having the logical address calculated using a final stored pointer is replaced or not during the wear leveling.

15. The method according to claim 14, wherein when the logical block having the calculated logical address is not a replacement target block, the replacement block is determined as an extra replacement block, and the wear leveling is performed on the replacement block as a normal data block.

* * * * *